March 10, 1953 R. VERCH, SR 2,630,787
HYDRAULIC JACKING SYSTEM
Filed Oct. 6, 1947 2 SHEETS—SHEET 1

Inventor
Raymond Verch, Sr.

March 10, 1953 R. VERCH, SR 2,630,787
HYDRAULIC JACKING SYSTEM
Filed Oct. 6, 1947 2 SHEETS—SHEET 2

*Inventor*
Raymond Verch, Sr.

By Clarence A. O'Brien
and Harvey B. Jacobson
*Attorneys*

Patented Mar. 10, 1953

2,630,787

UNITED STATES PATENT OFFICE 2,630,787

HYDRAULIC JACKING SYSTEM

Raymond Verch, Sr., Albany, N. Y.

Application October 6, 1947, Serial No. 778,133

2 Claims. (Cl. 121—46)

The present invention comprises novel and useful improvements in a safety jack system and more particularly pertains to a hydraulic arrangement incorporated in an automotive vehicle for lifting the same.

The principal object of this invention resides in providing a fluid pressure operated jack system for lifting vehicles.

An important feature of the invention resides in providing a fluid pressure operated jack system having improved means for selectively raising and lowering one or more jacks simultaneously.

A further important feature of the invention resides in the provision of a fluid pressure operated jack system wherein a single source of fluid pressure conveniently located may operate one or more separately positioned jacks.

Another important feature of the invention resides in the provision of an improved conduit system for connecting the source of fluid pressure to one or more jacks for raising and lowering the same.

A further important feature of the invention resides in providing a fluid pressure operated system of jacks provided with an improved valve controlling system therefor.

And a final important feature of the invention to be specifically enumerated herein, consists in providing a fluid pressure operated jack system as set forth in the preceding objects and features and having incorporated therein improved safety valve means for rendering more satisfactory the operation thereof.

These, together with various ancillary objects of the invention which will later become apparent as the following description proceeds, are attained by this apparatus, a preferred embodiment of which has been illustrated, by way of example only, in the accompanying drawings, wherein:

Figure 3 is a detail view, taken in vertical transverse section through one of the jacks and showing on an enlarged scale the lower end thereof;

Figure 4 is a detail view taken in horizontal section substantially upon the plane of the section line 4—4 of Figure 3;

Figure 6 is a detail view in vertical transverse section taken through one of the two-way control valves of the system; and, Figure 7 is a view taken in vertical transverse section through the distributing valve of the invention.

Referring now more specifically to the accompanying drawings, wherein like numerals designate similar parts throughout the various views, 10 designates generally the frame construction or chassis of a vehicle such an an automotive vehicle, of known type, which chassis is provided with supporting brackets 12 positioned at suitable points thereon. These brackets may be positioned inwardly or outwardly of the frame members of the chassis, and in front of or behind the wheels, as desired, the position of the outside of the frame and to the rear of the wheels being regarded as preferable for use on an automotive vehicle.

Figure 2:
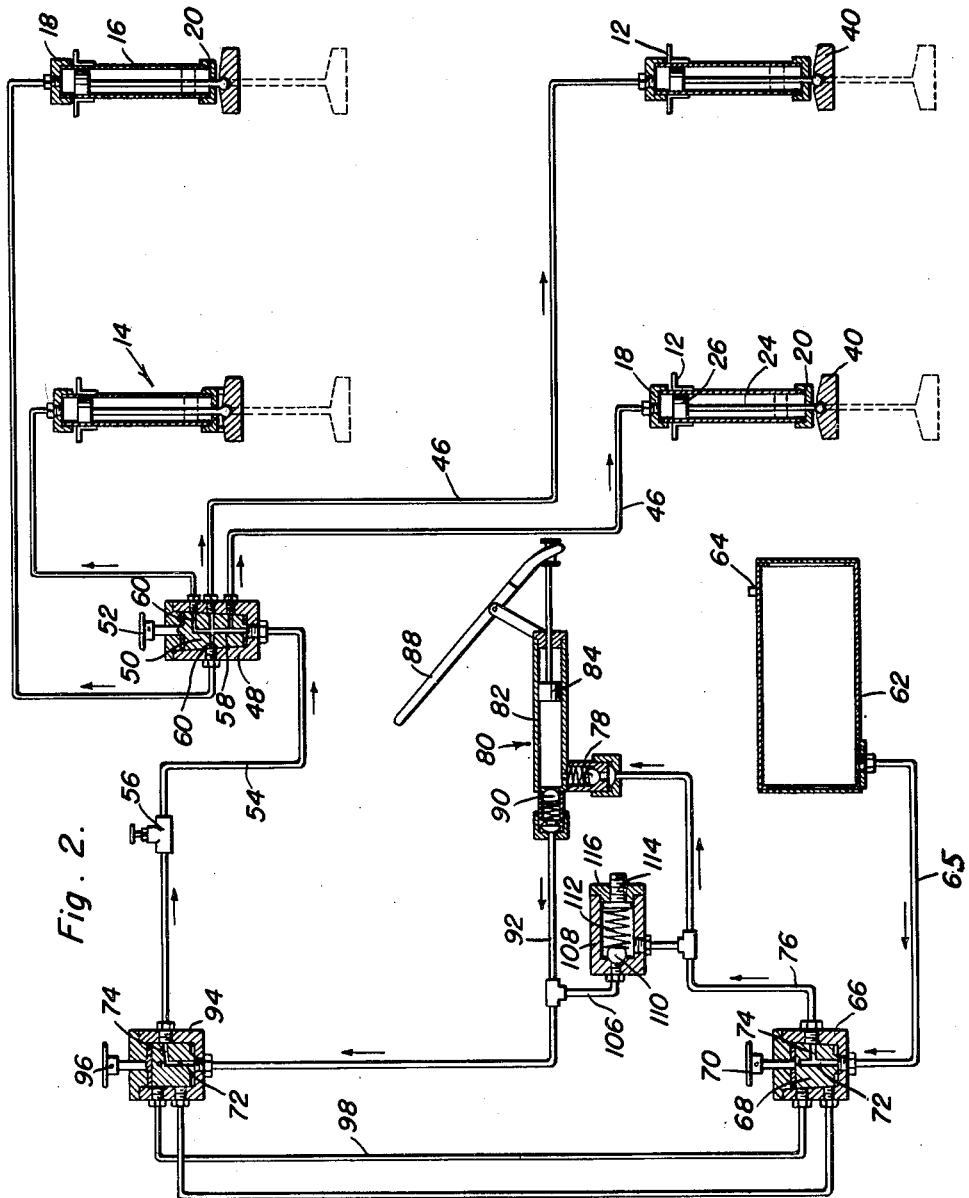
Figure 2 is a diagrammatic plan view, parts being shown in section to illustrate the interior construction thereof, of a suitable system for operating one or more jacks from a single source of pressure.
Figure 5:
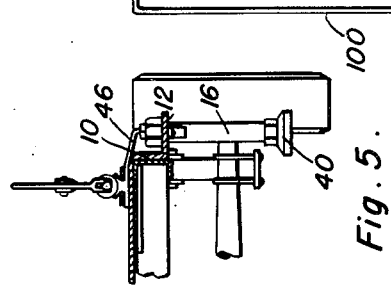
Figure 5 is a fragmentary detail view taken in elevation substantially upon the vertical plane of the section line 5—5 of Figure 1.

As shown in the detail view of Figure 5, and in the diagrammatic view of Figure 2, each of the brackets 12 has attached thereto a fluid pressure operated jack indicated in its entirety by the numeral 14. Each of these jacks, includes a tubular barrel 16 having detachable top and bottom caps 18 and 20 respectively. The barrel 16 is suitably secured in a rigid manner to the support bracket 12, and with the top cap 18 positioned on the upper side thereof, while the lower portion of the barrel and the bottom cap 20 are disposed therebeneath.

As shown best in the detail view of Figure 3, the cap 20 screw-threadedly engages the lower portion of the barrel 16 and is centrally apertured as at 22 to slidably receive a piston rod 24 extending therethrough, which piston rod is provided with an integral or if desired, a separately formed but rigidly attached piston 26 upon the upper end thereof and slidable within the fluid pressure cylinder 16. Adjacent the lower end of the piston rod 24, is provided an annular groove or recess 28 which is engaged by a correspondingly shaped arcuate portion 30 of a resilient wire retaining ring 32 disposed and seated in a recess or channel 34 at the bottom portion of the cap 20, as shown in Figures 3 and 4.

The inherent resiliency of the oppositely disposed arcuate arms 36 of the member 32, retain this member in the recess 34, whereby when the piston rod 24 is in its raised position as shown in Figure 3, the arcuate spring portion 30 will yieldingly engage the channel portion 28, to thereby retain the piston rod in said raised position. However, when the piston rod is forced downwardly, by means to be later described, the channel portion 28 will be forced through the arcuate portion 30, whereby the piston rod may reciprocate in the axial aperture 22.

At its lower extremity, and below the cap member 20, the piston rod terminates preferably in a ball 38 upon which is swively mounted a plate 40 constituting a foot for the fluid pressure operated jack. Preferably, an annular channel or a recess of other shape as desired, is provided in the upper portion or surface of the plate 40, and a ring or strip 44 of resilient and cushioning material such as rubber or the like, is seated in this channel 42 for selective engagement with the lower portion of the bottom cap 20 when the piston rod and foot plates 40 are in their raised position, to thereby prevent rattling or loose motion between the plate 40 and the cap 20 when the piston is in its raised position.

The swivelling connection between the ball 38 and the foot plate 40 permits adjustment of the latter plates to accommodate themselves to irregularities in the ground or supporting surface engaged by the jack. If desired, obviously other swivelling means such as a universal joint or other equivalent elements may be substituted for the ball and socket connection.

As shown in Figure 2, the top caps 18 of each of the jacks 14 is connected by a jack conduit 46 to suitable ports in the side of a barrel casing 48 having a rotatable valve plug 50 therein which is operable as by a handle means 52. Connected axially to the bottom of the valve casing 48, is a valve conduit 54 provided with a flow regulating and cut-off valve 56 of any suitable and desired construction. The rotatable valve plug 50 is provided with an axial passage 58 whose lower end constantly registers with the inlet port of the conduit 54; and which communicates by means of lateral branches 60 with ports of the valve casing 48 to which are connected the individual jack conduits 46. The valve plug 50 may be adjusted by means of the handle 52 to cause the conduit 54 to be placed into separate or simultaneous communication with each of the jack conduits 56. or to simultaneously cut off such communication.

Alternatively, as shown in Figure 7, the valve plug 50 may be adjusted to such a position that the conduits 46 of one or more of the jacks may be placed in communication with the conduit 54, the other one or more conduits being disconnected simultaneously, and alternatively by properly turning and adjusting the valve. By this arrangement, the one or more jacks of an automotive vehicle may be separately or simultaneously operated without the necessity of raising the entire vehicle.

Indicated at 62 is a pressure fluid storage tank of any suitable construction provided preferably with an air vent 64 if liquid is employed as the operating fluid, and by means of which the tank may be filled when it is necessary to add liquid or fluid thereto. A conduit 65 connects this tank with an axial port at the lower end of a two-way valve casing 66 having a rotatable valve plug 68 provided with operating handle 70. An axial bore 72 in the plug 68 constantly registers with the inlet port of the conduit 65, by means of a lateral bore 74, and selectively establishes comunication with a discharge port from the casing 66, to which is connected an inlet conduit 76 communicating by means of an inlet check valve 78 with any suitable source of fluid pressure indicated generally at 80. This latter source, if desired, may be an automatic pump, a pressure tank, or any other suitable pressure producing means, a hand pump consisting of a cylinder 82 and piston 84 reciprocable therein by an operating handle 86 being illustrated in the interest of simplicity. By means of an outwardly opening check valve 90, the cylinder 82 establishes communication through its discharge port with a discharge conduit 92 which, in turn, communicates by an axial port in the bottom of a second valve casing 94, having an operating handle 96, and an operating rotary plug disposed therein which is identical in every respect with that of the valve 66. Similar ports are provided in the casing of valve 94 to the ports in the casing of valve 66. Extending through the sides of the casing 94 is a port connecting with the distributor valve conduit 54. Each of the valve casings 66 and 94, is provided with a first and second port, to which are respectively connected first and second conduits 98 and 100. The two-way valves 66 and 94, of identical construction, may occupy either the position shown in Figure 2, or the position shown in Figure 6. In the former position, communication of each of the valves with the first and second conduits 98 and 100 is cut off; while in the latter position communication of these conduits is established. For this latter purpose, the rotary valve plugs 68 are provided with an upper passage 102 which is capable of establishing communication with the first or upper port of each of the valve casings and with the conduits 54 and 76 connected to the valves 94 and 66 respectively. At the same time, the rotary valve plugs 68 are provided with a lower transverse passage 104 which intersects the axial bore 72 and communicates with the second or lower port, whereby the conduits 92 and 64 of the valves 94 and 66 respectively are placed in communication with the second conduit 100.

The operation of the device as so far described is as follows:

When it is desired to elevate the vehicle or the device to which the system of jacks is applied, the valves 94 and 66 are adjusted to the position shown in Figure 2, whereby communication of either valve with conduits 98 and 100 is disconnected. The flow control valve 56 is open to the desired position of adjustment and the distributing valve 48 is turned to the position of Figures 2 or 7 in accordance with the number of jacks it is desired to operate.

Upon operation of the source of fluid pressure 80, the fluid medium is drawn by suction from the tank 62 through the conduit 65, axial bore 72, transverse bore 74 into the inlet conduit 76, and thence by way of check valve 78 into the cylinder 82. The fluid under pressure is then discharged by way of outlet conduit 92 to the two-way valve casing 94, and thence by way of axial bore 72 and transverse bore 74 is discharged to the distributor valve conduit 54 past the control valve 56, and delivered into the axial bore 58 of the distributor valve plug 50. From thence by means of the registering lateral bore 60 and jack conduits 46, the pressure fluid is supplied to the interior of the cylinder 16 and drives the pistons 26 downwardly therein, disengaging the piston retaining spring means 30 and forcing the plates 40 into engagement with the ground, whereupon further movement of the pistons serve to elevate the device to which the jacks are attached. When the device, such as the automotive vehicle is raised to the desired height, it may be locked in that position by rotating the selector valve handle 52 to disconnect the conduits 46 from the conduit 54; and as a further safety feature the control valve 56 which may be of the needle valve type, may be moved into its closed position, thereby preventing any backward flow of fluid from the jack cylinders.

When it is desired to raise a jack or jacks, the rotary plug 50 of the distributor valve 48 is turned to the position shown in Figure 2, the needle control valve 56 is open, and the two two-way valves 94 and 66 are turned to the position shown in Figure 6. A fluid passage is now established from one or more of the jacks 16 to the axial passage 58 of the selector valve plug 50, and thence by way of conduit 54 to the valve casing 94. From thence, a communication is established by way of passage 68, see Fig. 6, the first conduit 98, into passageway 68 of valve casing 66; and thence by way of conduit 76 to the cylinder 82. From thence, a passageway extends through conduit 92, axial bore 72 of valve 94, lateral passageway 104 and by way of second conduit 100 to the lateral passageway 104 of the valve 66 and thence by way of axial bore 72 to the line 65 and from thence to the storage tank 62. Preferably, enough resistance to flow is maintained in this circuitous path to prevent any appreciable rate of flow from the individual jack cylinders; whereby a positive actuation of the fluid pressure source 80 is required to evacuate jack cylinders and retract the jack pistons therein. When the parts are arranged in this position, actuation of the handle 86 is therefore effective to force circulation of fluid and compel evacuation of the individual jack or jacks, to thereby collapse the same and retract the piston rods into each of the cylinders. When the piston rods have reached their upward limit of travel, the spring means 30 engages in the groove 28 to yieldingly retain the parts in collapsed position, with the packing means 44 preventing rattling or loose fit between plate 40 and the bottom of the cap 20.

Attention is now directed to Figure 2 wherein there is disclosed a further safety feature facilitating the satisfactory operation of the mechanism. For this purpose, a bypass conduit 106 is connected between the inlet and outlet conduits 76 and 92, and a pressure release valve casing 108 is connected in this bypass conduit 106. As shown, this casing consists of a hollow cylinder having a check valve 110 controlling an inlet port from the discharge conduit 92, which check valve is biased to its seat by a spring 112 whose tension is adjusted by a set screw 114 extending through the cover plate 116 of the valve casing. The spring 112 is so loaded that when a predetermined maximum pressure is maintained or attained in the pressure producing source 80 and in the discharge conduit 92, the check valve 110 will open whereby further pressure causes a flow through the bypass 106 to the inlet conduit communicating with the suction side of the pressure source, thereby preventing the exceeding of a predetermined and adjustable pressure. This arrangement has the desirable function that when the jacks have been opened to their fullest extent, any further excess pressure tending to further extend the jack is released through the bypass 106. Further, if through any fault in the conduit and valve arrangements, such as a valve being inadvertently closed, excess pressure is vented preventing damage to the system.

It is obvious that the concept of the invention envisions the position of the source of fluid pressure 80, and of the control valves 66, 94, 48, 56 and 108 at any of these convenient locations about the device with which the jacks are to be used.

Figure 1:
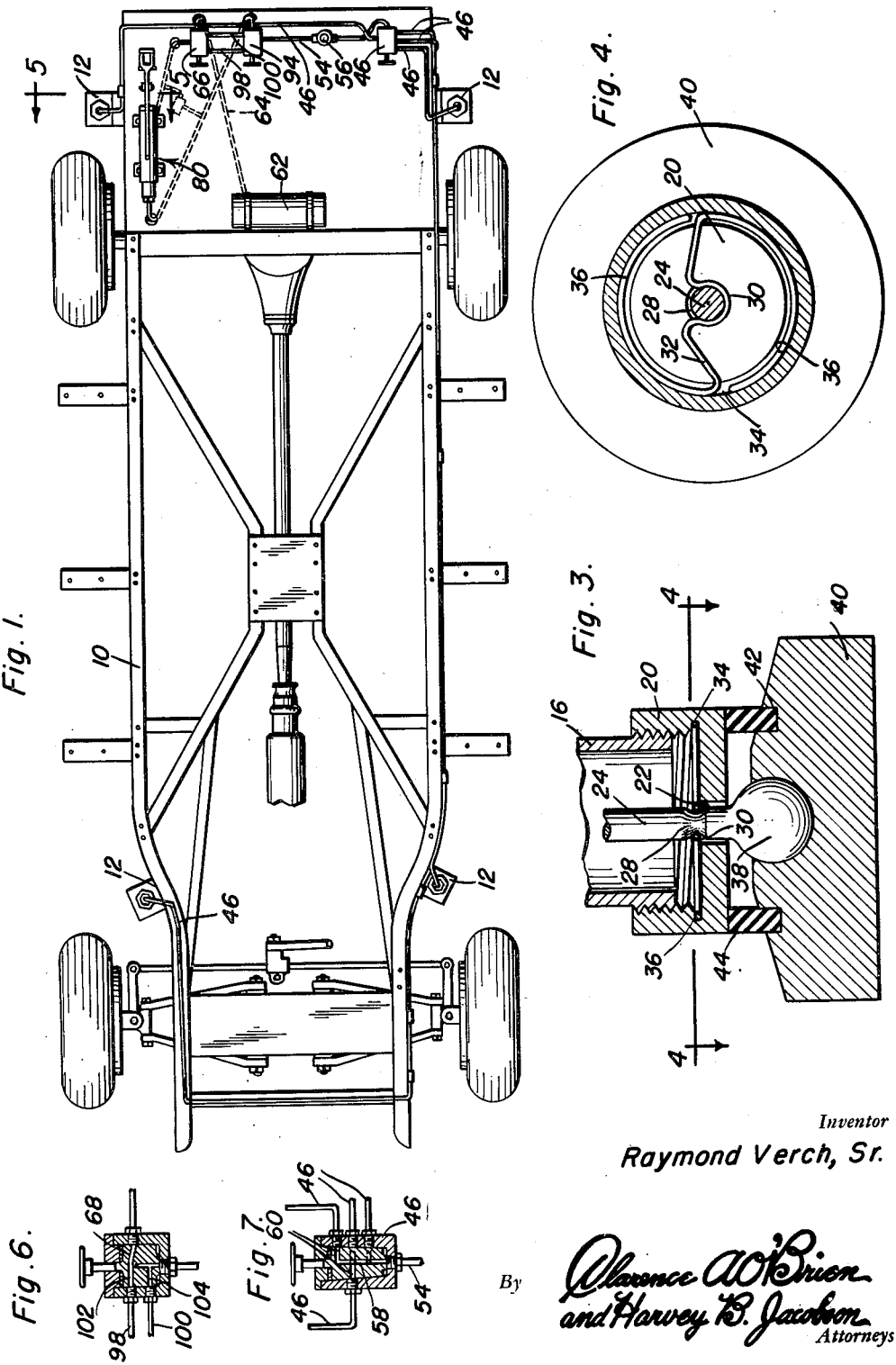
Figure 1 is a top plan view of an automobile chassis, showing the manner of applying the invention thereto, certain concealed parts being indicated by dotted lines.

Thus, while the jacks may be mounted as shown in Figure 1 upon various parts of the chassis or frame of an automotive vehicle, the above mentioned valves and fluid pressure source may be mounted at other convenient points upon the vehicle and remote from the various jacks as in the trunk compartment of the vehicle, under the hood, beneath the floor boards and in general, singly or collectively in any desired enviroment.

It will be further understood that the principles of the invention are not limited to the use of any particular fluid pressure, since hydraulic fluid, pneumatic pressure, may all readily be employed with the construction shown. Further, the valve constructions illustrated are merely of one satisfactory type of valve, it being understood that various other valve constructions and arrangements may be resorted to.

Since numerous modifications will be readily apparent to those skilled in the art after a consideration of the foregoing specification and attached drawings, it is not intended to limit the principles of the invention to the exact construction shown and described, but all suitable modifications and equivalents may be resorted to falling within the scope of the appended claims.

Having described the invention, what is claimed as new is:

1. A hydraulic jack comprising a tubular barrel having removable top and bottom caps, means connecting the top cap to a source of fluid pressure, a piston slidably mounted in said barrel, a piston rod carried by said piston and slidably extending through said bottom cap, a foot carried by the lower end of said piston rod, an annular groove in said piston rod adjacent its connection to said foot, an annular groove in the interior wall of said bottom cap, a generally S-shaped spring having its ends received within said annular groove in said bottom cap, the intermediate portion of said spring being in the form of a spring loop encircling said piston rod and resiliently seating within said annular groove in the piston rod to resiliently retain said piston rod in a retracted position.

2. The combination of a cylindrical member having a bottom wall, an opening in said bottom wall, a rod mounted within said cylindrical member and slidably passing through said opening, an annular groove in the inner wall of said cylindrical member, a spring mounted within said annular groove, said spring being generally S-shaped and having its opposed ends retained within said annular groove, the spring having a central portion bent in the form of a spring loop, said loop encircling said rod and resiliently engaging in an annular recess therein for resiliently positioning said rod with respect to said cylindrical member.

RAYMOND VERCH, Sr.

REFERENCES CITED

The following references are of record in the file of this patent:

UNITED STATES PATENTS

| Number | Name | Date |
| --- | --- | --- |
| 1,463,654 | McNulty | July 31, 1923 |
| 1,538,167 | Chappell et al. | May 19, 1925 |
| 1,613,268 | Eisler | Jan. 4, 1927 |
| 1,711,565 | Hatfield et al. | May 7, 1929 |
| 1,769,534 | Nattrass | July 1, 1930 |
| 1,780,972 | Neuberg | Nov. 11, 1930 |
| 2,060,344 | Perkins | Nov. 10, 1936 |
| 2,081,248 | Murphy | May 25, 1937 |
| 2,381,923 | Obtresal | Aug. 14, 1945 |

FOREIGN PATENTS

| Number | Country | Date |
| --- | --- | --- |
| 333,510 | Great Britain | Aug. 12, 1930 |
| 516,739 | Great Britain | Jan. 10, 1940 |